United States Patent
Sharma et al.

(10) Patent No.: US 12,249,122 B2
(45) Date of Patent: Mar. 11, 2025

(54) HOLOGRAPHIC DISPLAY CALIBRATION USING MACHINE LEARNING

(71) Applicant: GM Global Technology Operations LLC, Detroit, MI (US)

(72) Inventors: Manoj Sharma, Troy, MI (US); Thomas A. Seder, Fraser, MI (US); Kai-Han Chang, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 385 days.

(21) Appl. No.: 17/817,061

(22) Filed: Aug. 3, 2022

(65) Prior Publication Data

US 2024/0046619 A1 Feb. 8, 2024

(51) Int. Cl.
*G06V 10/77* (2022.01)
*G02B 27/01* (2006.01)
*G06V 10/82* (2022.01)

(52) U.S. Cl.
CPC ..... *G06V 10/7715* (2022.01); *G02B 27/0103* (2013.01); *G06V 10/82* (2022.01)

(58) Field of Classification Search
None
See application file for complete search history.

(56) References Cited

U.S. PATENT DOCUMENTS

| 8,577,186 B1* | 11/2013 | Gigushinski | G06T 3/18 |
| | | | 382/300 |
| 11,892,746 B1* | 2/2024 | Mazed | G02F 1/225 |
| 2019/0317451 A1* | 10/2019 | Supikov | G06F 18/214 |
| 2020/0020165 A1* | 1/2020 | Tran | G06F 3/011 |
| 2023/0171385 A1* | 6/2023 | Chakravarthula | G03H 1/2205 |
| | | | 348/40 |

FOREIGN PATENT DOCUMENTS

KR 2023165584 A * 12/2023 ............. G06T 3/067

* cited by examiner

*Primary Examiner* — Delomia L Gilliard
(74) *Attorney, Agent, or Firm* — Vivacqua Crane, PLLC (57) ABSTRACT

A system comprises a computer including a processor and a memory. The memory includes instructions such that the processor is programmed to receive, at a deep neural network, an image captured by an image capture device. The processor is also programmed to generate a predicted distortion map based on the image and update at least one weight of the deep neural network based on a loss function of the deep neural network.

20 Claims, 9 Drawing Sheets

HOLOGRAPHIC DISPLAY CALIBRATION USING MACHINE LEARNING

INTRODUCTION

The present disclosure relates to calibrating holographic displays to mitigate distortions using machine learning.

Head-up Displays (HUDs) can be used in vehicles to assist occupants in vehicle navigation. For example, the HUDs can be used to project data from the dashboard and other vehicle related data in a virtual image (e.g., a hologram) in front of the windshield. In addition, in the virtual image, the HUDs can annotate objects (e.g., vehicles, cyclists, pedestrians, landmarks, etc.) with virtual signs, display navigational data (e.g., turn arrows, highlighted exits, etc.), enhance vision at night and in low visibility conditions (e.g., fog, rain, blizzard, etc.), and so on. The HUDs can improve situation awareness of the occupants and improve occupants' comfort level and trust in autonomous driving capabilities of vehicles.

SUMMARY

A system comprises a computer including a processor and a memory. The memory includes instructions such that the processor is programmed to receive, at a deep neural network, an image captured by an image capture device. The processor is also programmed to generate a predicted distortion map based on the image and update at least one weight of the deep neural network based on a loss function of the deep neural network.

In other features, the deep neural network comprises a convolutional neural network.

In other features, the convolutional neural network comprises a feed-forward convolutional neural network.

In other features, the image comprises an image projected onto a screen via an Augmented Reality based Head-up Display (AR-HUD) device.

In other features, the screen comprises a windshield.

In other features, the processor is further programmed to update the at least one weight using stochastic gradient descent with backpropagation.

In other features, the processor is further programmed to determine at least one mapping of an input pixel to an output pixel based on the predicted distortion map.

A system comprises a computer including a processor and a memory. The memory includes instructions such that the processor is programmed to receive, at a convolutional neural network, an image captured by an image capture device. The processor is also programmed to generate a predicted distortion map based on the image and update at least one weight of the convolutional neural network based on a loss function of the convolutional neural network.

In other features, the convolutional neural network comprises a feed-forward convolutional neural network.

In other features, the image comprises an image projected onto a screen via an Augmented Reality based Head-up Display (AR-HUD) device.

In other features, the screen comprises a windshield.

In other features, the processor is further programmed to update the at least one weight using stochastic gradient descent with backpropagation.

In other features, the processor is further programmed to determine at least one mapping of an input pixel to an output pixel based on the predicted distortion map.

A method includes receiving, at a deep neural network, an image captured by an image capture device, generating a predicted distortion map based on the image, and updating at least one weight of the deep neural network based on a loss function of the deep neural network.

In other features, the deep neural network comprises a convolutional neural network.

In other features, the convolutional neural network comprises a feed-forward convolutional neural network.

In other features, the image comprises an image projected onto a screen via an Augmented Reality based Head-up Display (AR-HUD) device.

In other features, the screen comprises a windshield.

In other features, the method includes updating the at least one weight using stochastic gradient descent with backpropagation.

In other features, the method includes determining at least one mapping of an input pixel to an output pixel based on the predicted distortion map.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Augmented Reality (AR) based Head-up Displays (HUDs) can be used to produce virtual images that fuse with and can be overlaid on real world objects to enhance situation awareness by increasing saliency of relevant objects, annotating real world objects with useful information, and improving user experience. Images can be projected on the HUDs using Computer Generated Holography (CGH).

In various environments, the AR-HUDs can generate and can project virtual images onto portion of a windshield within a field-of-view (FOV) of a driver. However, in some instances, the projected virtual images may be distorted, i.e., include anomalies, due to windshield imperfections and/or windshield surface disproportion.

Typically, these distortions are corrected using cumbersome and costly calibration procedures. For example, to correct a projected image, the image is characterized at nine (9) points within an eye box. Then, nine (9) unique warp maps are generated using suitable algorithms.

As discussed herein, neural networks can be trained to generate distortion maps based on a projected image. These neural networks can be deployed at facilities in which windshields are manufactured, which can result in calibration time and reduced cost.

Figure 1:
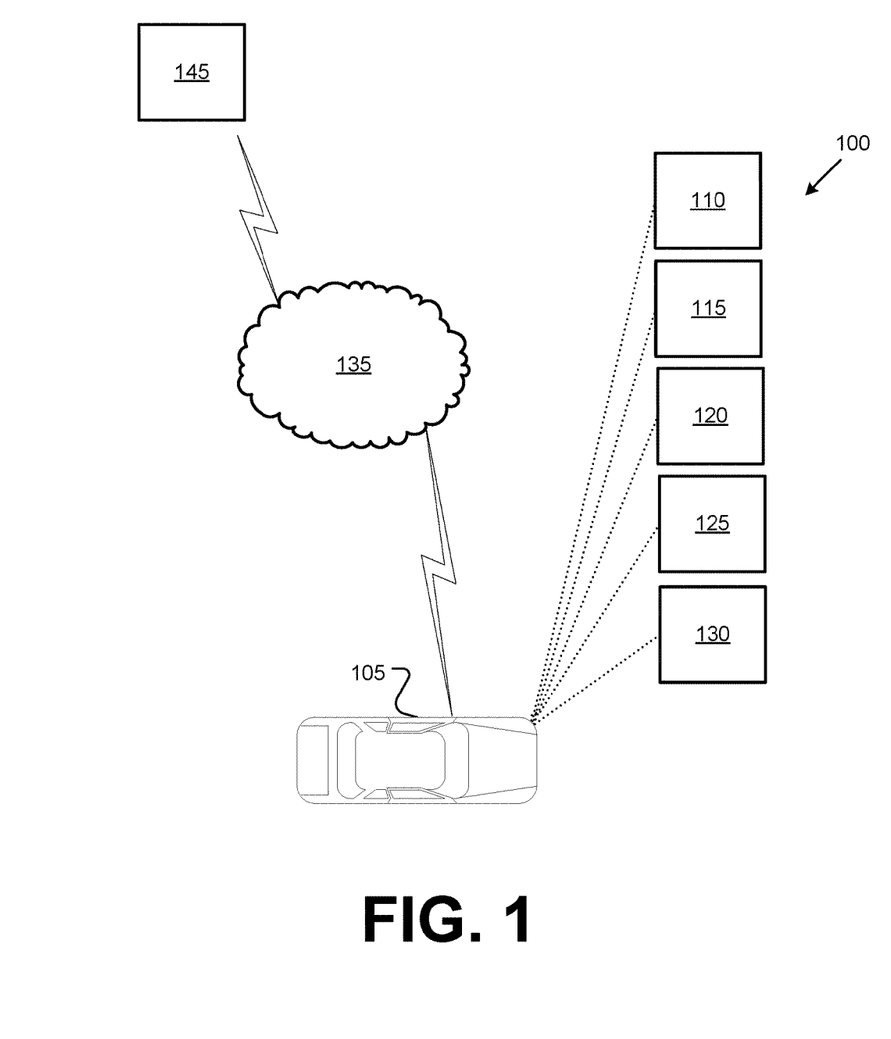
FIG. 1 is a block diagram of an example system including a vehicle.

FIG. 1 is a block diagram of a system 100 according to an example implementation. The system 100 includes a vehicle 105, which can comprise a land vehicle such as a car, truck, etc., an aerial vehicle, and/or an aquatic vehicle. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

The computer 110 can include one or more suitable planning modules and/or suitable perception modules that operate the vehicle 105 according to determined driving plans when the vehicle 105 is operating in a semi-autonomous mode of operation or an autonomous mode of operation. For example, the planning modules and/or the perception modules can cause the vehicle 105 to traverse a driving path according to the driving plan and perceived environment.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110. The vehicle 105 communications network can include one or more gateway modules that provide interoperability between various networks and devices within the vehicle 105, such as protocol translators, impedance matchers, rate converters, and the like.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects, etc., relative to the location of the vehicle 105. The vehicle sensors 115 may further include camera sensor(s) 115, e.g., front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2I) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short-range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

As discussed in greater detail below, the server 145 can train a neural network to mitigate distortions within a projected image. As discussed above, the projected image may comprise a digital image generated by an Augmented Reality (AR) based Head-up Display (HUD). Within the present context, the server 145 can comprise a remote server that trains the neural network and transmits the trained neural network to one or more vehicles 105 via the network 135.

Figure 2:
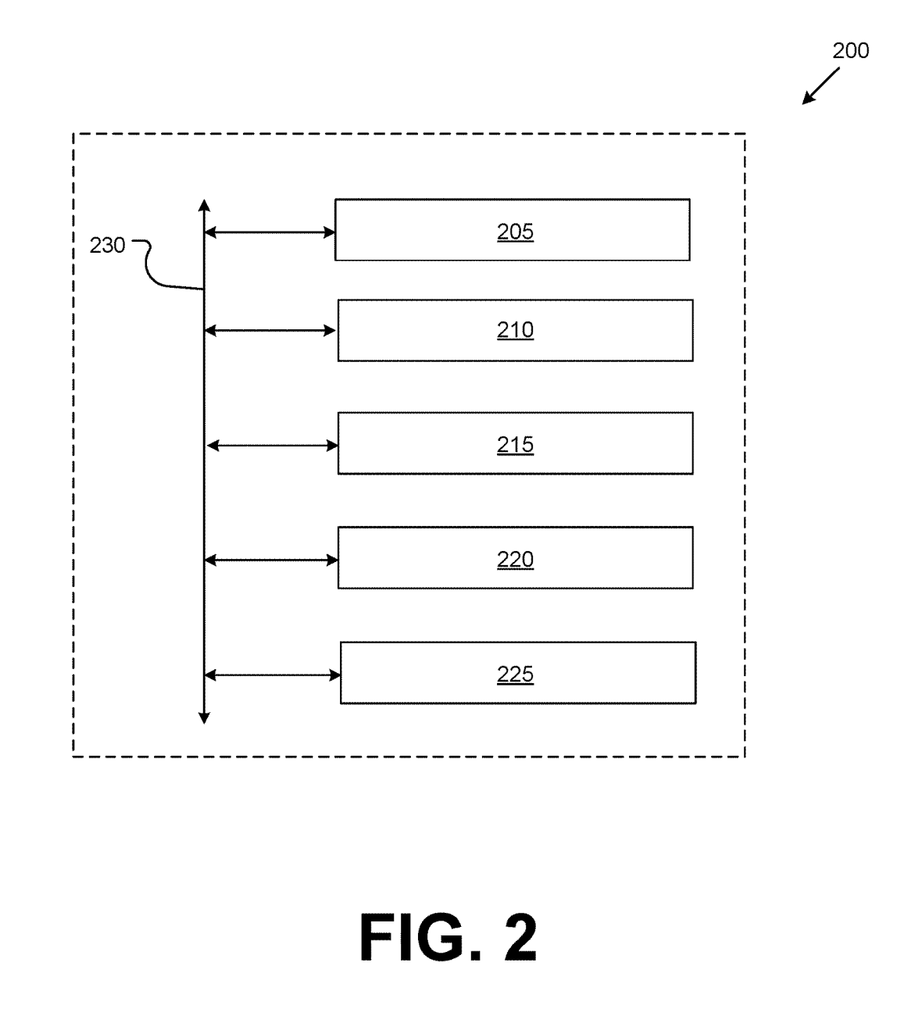
FIG. 2 is a block diagram of an example computing device.

FIG. 2 illustrates an example computing device 200, i.e., the computer 110, the server (s) 145, and/or an AR-HUD device 600 (see FIG. 6), that may be configured to perform one or more of the processes described herein. As shown, the computing device 200 can comprise a processor 205, memory 210, a storage device 215, an I/O interface 220, and a communication interface 225. Furthermore, the computing device 200 can include an input device such as a touchscreen, mouse, keyboard, etc. In certain implementations, the computing device 200 can include fewer or more components than those shown in FIG. 2.

In particular implementations, processor(s) 205 includes hardware for executing instructions, such as those making up a computer program. As an example, and not by way of limitation, to execute instructions, processor(s) 205 may retrieve (or fetch) the instructions from an internal register, an internal cache, memory 210, or a storage device 215 and decode and execute them.

The computing device 200 includes memory 210, which is coupled to the processor(s) 205. The memory 210 may be used for storing data, metadata, and programs for execution by the processor(s). The memory 210 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 210 may be internal or distributed memory.

The computing device 200 includes a storage device 215 includes storage for storing data or instructions. As an example, and not by way of limitation, storage device 215 can comprise a non-transitory storage medium described above. The storage device 215 may include a hard disk drive (HDD), flash memory, a Universal Serial Bus (USB) drive or a combination of these or other storage devices.

The computing device 200 also includes one or more input or output ("I/O") devices/interfaces 220, which are provided to allow a user to provide input to (such as user strokes), receive output from, and otherwise transfer data to and from the computing device 200. These I/O devices/interfaces 220 may include a mouse, keypad or a keyboard, a touch screen, camera, optical scanner, network interface, modem, other known I/O devices or a combination of such I/O devices/interfaces 220. The touch screen may be activated with a writing device or a finger.

The I/O devices/interfaces 220 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 220 is configured to provide graphical data to a display for presentation to a user. The graphical data may be representative of one or more graphical user interfaces and/or any other graphical content as may serve a particular implementation.

The computing device 200 can further include a communication interface 225. The communication interface 225 can include hardware, software, or both. The communication interface 225 can provide one or more interfaces for communication (such as, for example, packet-based communication) between the computing device and one or more other computing devices 200 or one or more networks. As an example, and not by way of limitation, communication interface 225 may include a network interface controller (NIC) or network adapter for communicating with an Ethernet or other wire-based network or a wireless NIC (WNIC) or wireless adapter for communicating with a wireless network, such as a WI-FI. The computing device 200 can further include a bus 230. The bus 230 can comprise hardware, software, or both that couples components of the computing device 200 to each other.

Figure 3:
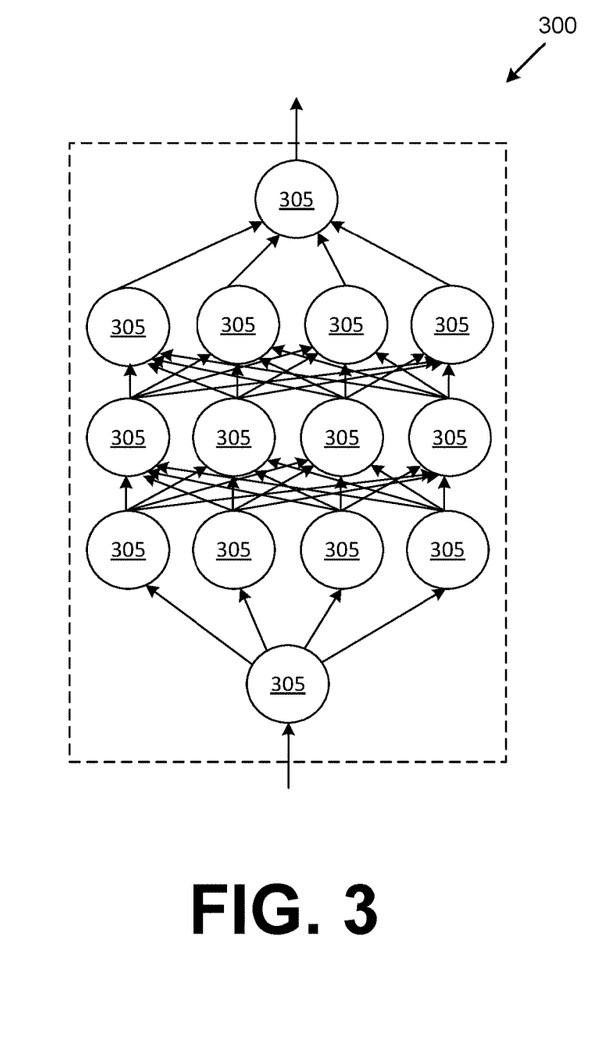
FIG. 3 is a diagram of an example deep neural network.
Figure 4:
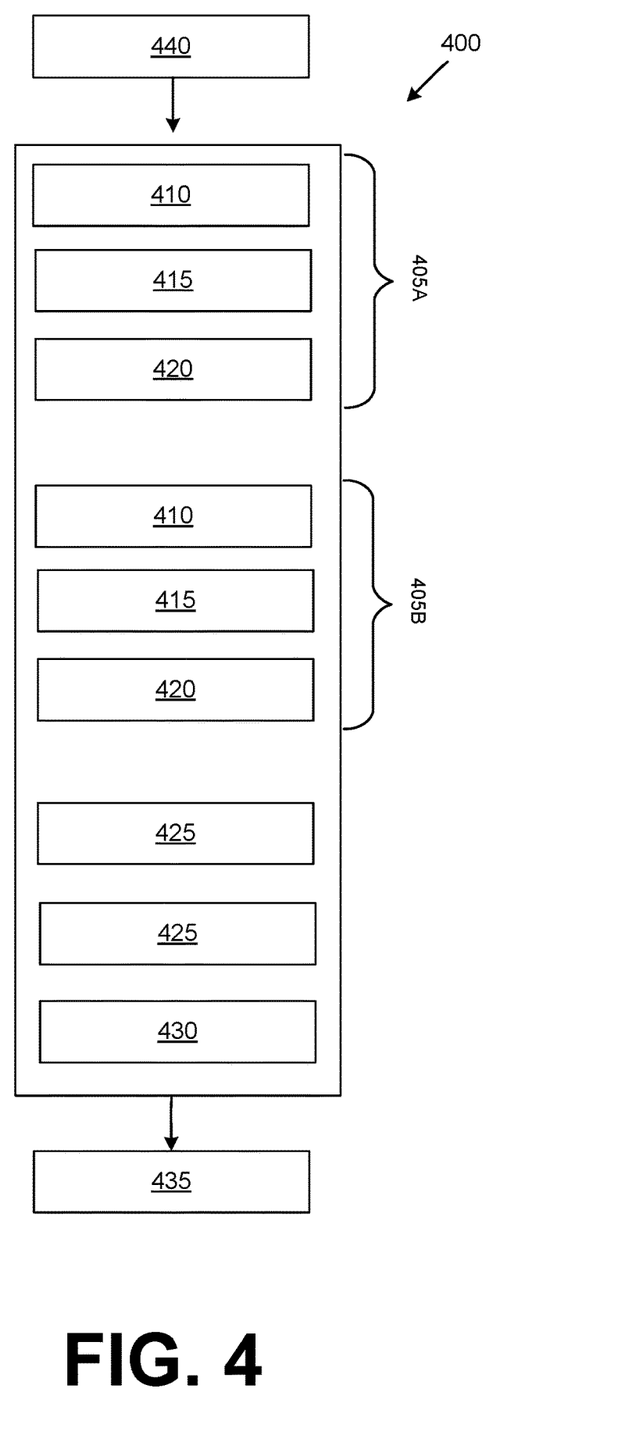
FIG. 4 is a diagram of an example convolutional neural network.

FIG. 3 illustrates an example deep neural network (DNN) 300. The DNN 300 may be representative of one or more neural networks described herein. The DNN 300 includes multiple nodes 305, and the nodes 305 are arranged so that the DNN 300 includes an input layer, one or more hidden layers, and an output layer. Each layer of the DNN 300 can include a plurality of nodes 305. While FIG. 4 illustrates three (3) hidden layers, it is understood that the DNN 300 can include additional or fewer hidden layers. The input and output layers may also include more than one (1) node 305.

The nodes 305 are sometimes referred to as artificial neurons 405, because they are designed to emulate biological, e.g., human, neurons. A set of inputs (represented by the arrows) to each node, i.e., neuron, 305 are each multiplied by respective weights. The weighted inputs can then be summed in an input function to provide, possibly adjusted by a bias, a net input. The net input can then be provided to activation function, which in turn provides a connected node 305 an output. The activation function can be a variety of suitable functions, typically selected based on empirical analysis. As illustrated by the arrows in FIG. 3, node 305 outputs can then be provided for inclusion in a set of inputs to one or more nodes 305 in a next layer.

The DNN 300 can be trained to accept data as input and generate an output based on the input. The DNN 300 can be trained with ground truth data, i.e., data about a real-world condition or state. For example, the DNN 300 can be trained with ground truth data or updated with additional data by a processor. Weights can be initialized by using a Gaussian distribution, for example, and a bias for each node 305 can be set to zero. Training the DNN 300 can including updating weights and biases via suitable techniques such as back-propagation with optimizations. Ground truth data can include, but is not limited to, calibration data for mitigating image distortion. For example, the ground truth data may be data specifying spatial transformation instructions that map one or more input pixel coordinates to one or more corresponding output pixel coordinates.

FIG. 4 is a block diagram illustrating an example trained DNN 300. In the implementation illustrated in FIG. 4, the trained DNN 300 is a convolutional neural network 400. The convolutional neural network 400 may include multiple different types of layers based on connectivity and weight sharing. As shown in FIG. 4, the convolutional neural network 400 includes convolution blocks 405A, 405B. Each of the convolution blocks 405A, 405B may be configured with a convolution layer (CONV) 410, a normalization layer (LNorm) 415, and a max pooling layer (MAX POOL) 420.

The convolution layers 410 may include one or more convolutional filters, which are be applied to input data 435 to generate output 440. Within the present context, the input data 435 can comprise digital images to be projected onto a windshield by an AR-HUD device, and the output 440 can comprise predicted calibration data. It is understood that the calibration data can comprise data specifying spatial transformation instructions that map one or more input pixel coordinates to one or more corresponding output pixel coordinates that account for a defined eye box.

While FIG. 4 illustrates only two convolution blocks 405A, 405B, the present disclosure may include any number of the convolution blocks 405A, 405B. The normalization layer 415 may normalize the output of the convolution filters. For example, the normalization layer 415 may provide whitening or lateral inhibition. The max pooling layer 420 may provide down sampling aggregation over space for local invariance and dimensionality reduction.

The deep convolutional network 400 may also include one or more fully connected layers 425 (FC1 and FC2). The deep convolutional network 400 may further include a Rectified Linear Unit (ReLU) layer 430 that provides activation function functionality. Between each layer 410, 415, 420, 425, 430 of the deep convolutional network 400 are weights that can be updated. The output of each of the layers (e.g., 410, 415, 420, 425, 430) may serve as an input of a succeeding one of the layers (e.g., 410, 415, 420, 425, 430) in the convolutional neural network 400.

Figure 5A:
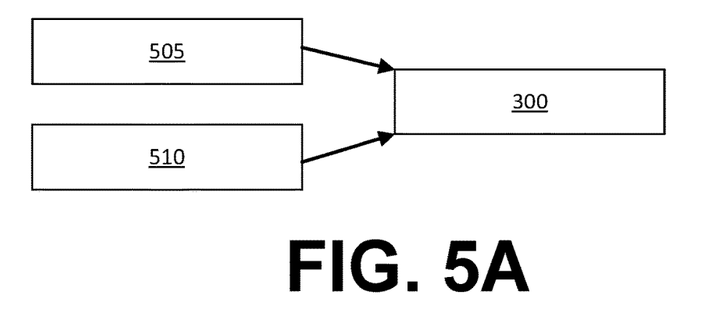
FIG. 5A is a diagram illustrating an example process for training a deep neural network.
Figure 5B:
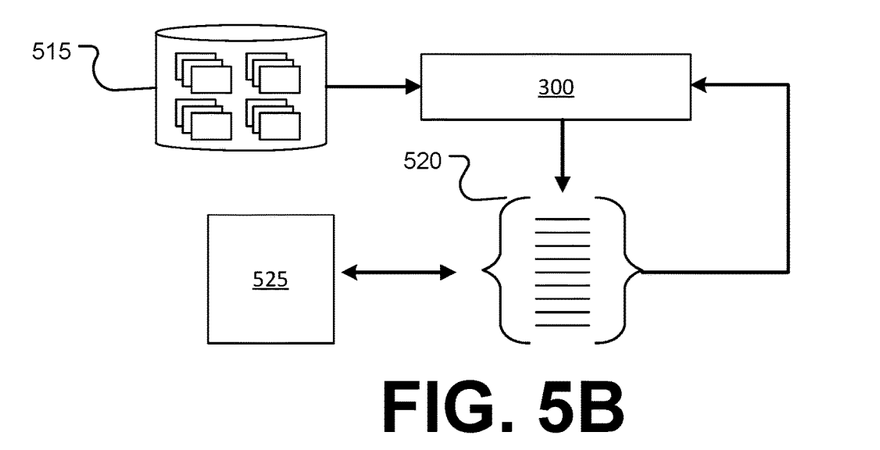
FIG. 5B is another diagram illustrating an example process for training a deep neural network.

FIGS. 5A and 5B illustrate an example process for training the DNN 300 in accordance with one or more implementations of the present disclosure. As shown in FIG. 5A, during an initial training phase, a DNN 300 receives a set of training data (e.g., distorted images 505 projected onto a windshield and a corresponding object distortion map 510). For instance, test digital images can be projected onto a screen, such as a windshield. An image capture device, such as a camera, can capture a distorted test digital image. Using the distorted test digital image, a processor estimates a distortion map using suitable estimation techniques. The estimation techniques can be selected according to an empirical analysis of the distortion at one or more predefined points of the windshield. Based on the estimated distortion map, the processor can calculate an object distortion map that can be applied to the test digital image to create a substantially undistorted image. The object distortion map can comprise mappings of one or more input pixel coordinates to one or more corresponding output pixel coordinates to mitigate image distortion.

After the initial training phase, at a supervised training phase, a set of N testing images 515 are input to the DNN 300. The DNN 300 generates an output representing a distortion map for each of the N training images 515. In various implementation, the DNN 300 can generate a prediction representing the distortion map at one or more points of the projected image. For example, the DNN 300 can predict a distortion map at nine (9) points.

FIG. 5B illustrates an example of generating output for one testing image 515 of the N testing images 515. Based on the initial training, the DNN 300 outputs a vector representation 520 of the predicted distortion map. The vector representation 520 is compared to the ground-truth data 525. The DNN 500 updates network parameters based on the comparison to the ground-truth boxes 525. For example, the network parameters, e.g., weights and/or bias parameters associated with the neurons, may be updated via backpropagation and/or stochastic gradient descent. In this example, the predicted distortion map can be compared to the distortion map included in the ground truth to determine a loss defined by a loss function.

The loss function determines how accurately the DNN 300 has processed the DNN 300. The DNN 300 can be executed a plurality of times on a single input testing image 515 while varying parameters that control the processing of the DNN 300. Parameters that correspond to correct answers as confirmed by a loss function that compares the outputs to the ground truth are saved as candidate parameters. Following the test runs, the candidate parameters that produce the most correct results are saved as the parameters that can be used to program the DNN 300 during operation.

Figure 5C:
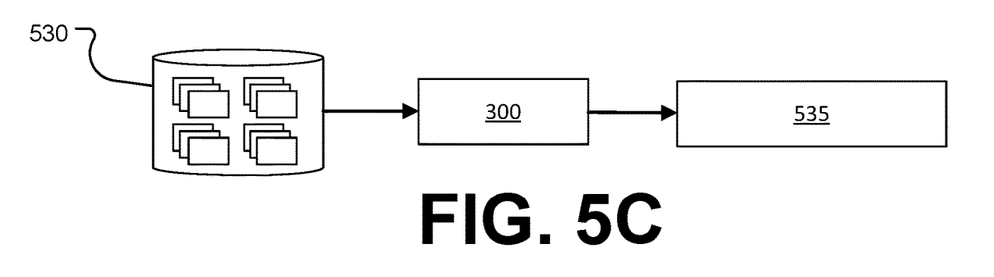
FIG. 5C is a diagram illustrating an example process for generating output at a deep neural network based on received input.

Referring to FIG. 5C, after training, the DNN 300 may be used to mitigate distortion within digital images that are to be projected onto a windshield. The output of the DNN 300 is the predicted distortion map that can be used to modify an image projected onto a windshield by an AR-HUD device.

Figure 6:
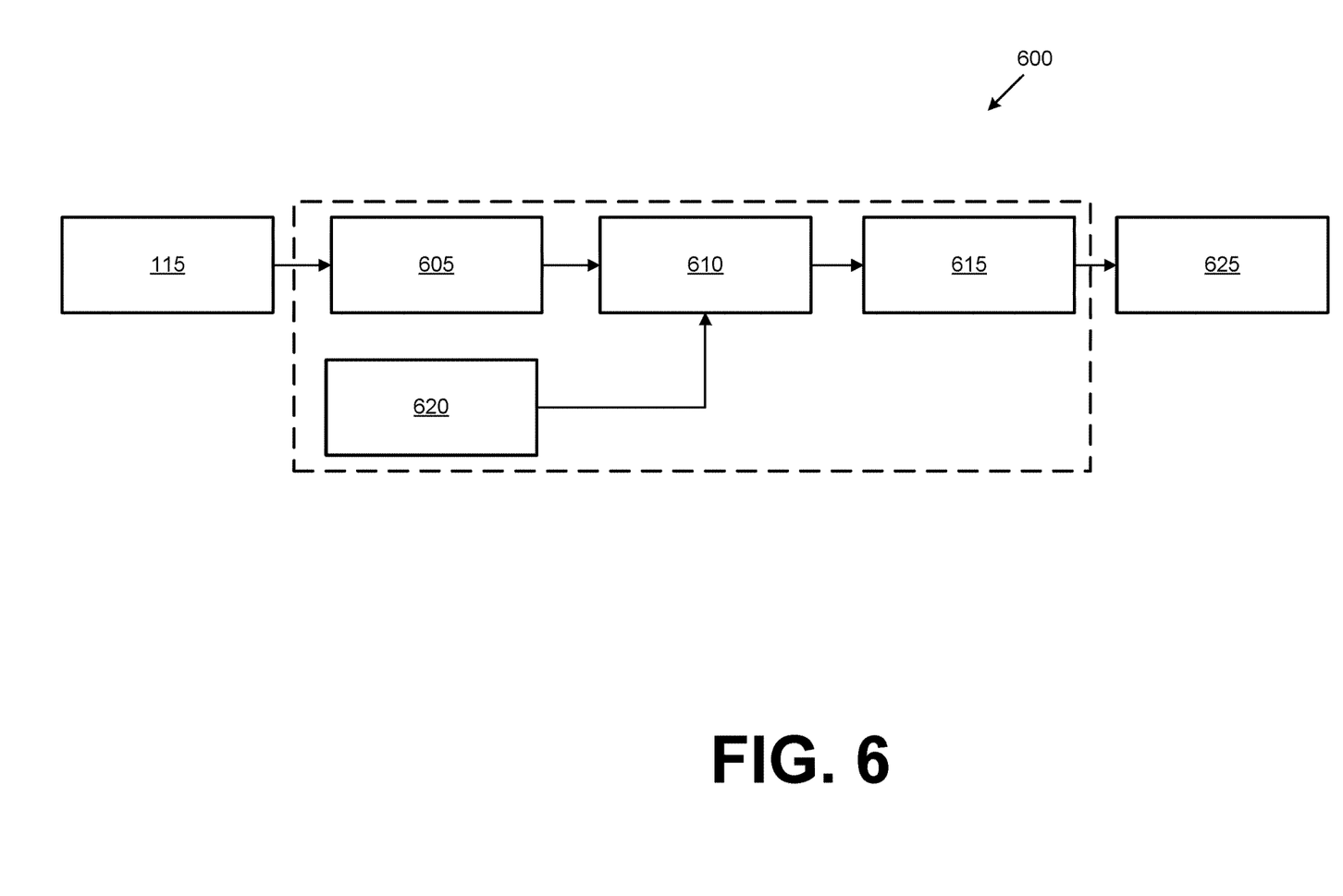
FIG. 6 is a diagram illustrating an example Augmented Reality (AR) based Head-up Display (HUD) system.

FIG. 6 shows an example of an Augmented Reality based Head-up Display (AR-HUD) device 600 for a vehicle, such as the vehicle 105. The AR-HUD device 600 comprises a processor 605, a Spatial Light Modulator (SLM) 610, a lens 615, and a light source 620. The system 600 further comprises a screen 625, e.g., the windshield of the vehicle. The system 600 can also be in communication with various sensors 110 of the vehicle 105. In an example implementation, the sensors 115 sense various parameters of the vehicle 105, such as speed, tire pressure, cabin temperature, statuses of restraints such as seat belts, and so on, which are typically displayed on a dashboard of the vehicle 105.

The processor 605 processes the data captured by the sensors 115 and calculates a hologram of object(s) that is to be projected in front of the screen 625. The processor 605 can implement a distortion map generated by the DNN 300 to mitigate any distortions within the projected digital image. For example, the processor 605 may use the distortion map to determine mappings of one or more input pixel coordinates to one or more corresponding output pixel coordinates to mitigate image distortion.

The processor 605 can add information to the hologram such as data from the dashboard of the vehicle, map of the road being traveled by the vehicle, and other annotations such as warnings, e.g., to highlight a pedestrian, a cyclist, etc. For example, the processor 605 can retrieve navigational data such as maps, weather, traffic, etc. via the network 135. The processor 605 can retrieve information about a nearby landmark, e.g., a museum, a restaurant, parking, etc. The processor 605 can add these types of data to the hologram.

The processor 605 encodes the image data (and the additional data to be displayed in the hologram) onto the SLM 610. The light source 620 irradiates one or more micro-mirrors within the SLM 610, which modulate the light. The modulated light output by the SLM 610 passes through the lens 615, and the substantially non-distorted holographic image is projected onto the screen 625.

Figure 7:
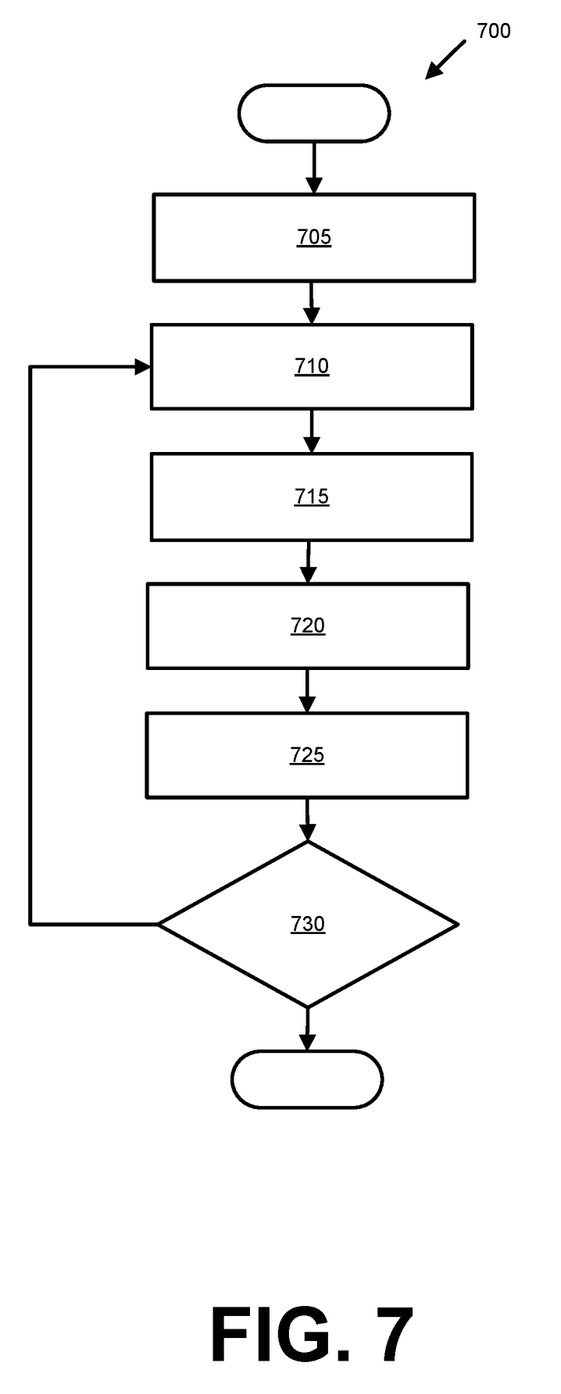
FIG. 7 is a flow diagram illustrating an example process for translating vehicle operation commands to vehicle-level commands.

FIG. 7 is a flowchart of an exemplary process 700 for collecting testing images for the DNN 300. The process 700 begins at block 705 in which an image capture device is positioned such that the image capture device can capture images projected onto a screen. For example, the image capture device is positioned such that the image capture device can capture images within the field-of-view of a driver. At block 710, a screen is positioned relative to the image capture device. At block 715, a test digital image is projected onto the screen.

At block 720, the image capture device captures the test digital image projected onto the screen. At block 725, a processor of the server 145 stores the captured test digital into a data structure, such as memory.

At block 730, a determination is made whether a number of iterations i equals a predetermined threshold n, where i and n are integers greater than zero (0). If i is less than n, the process 700 returns to block 710. Otherwise, the process 700 ends.

Figure 8:
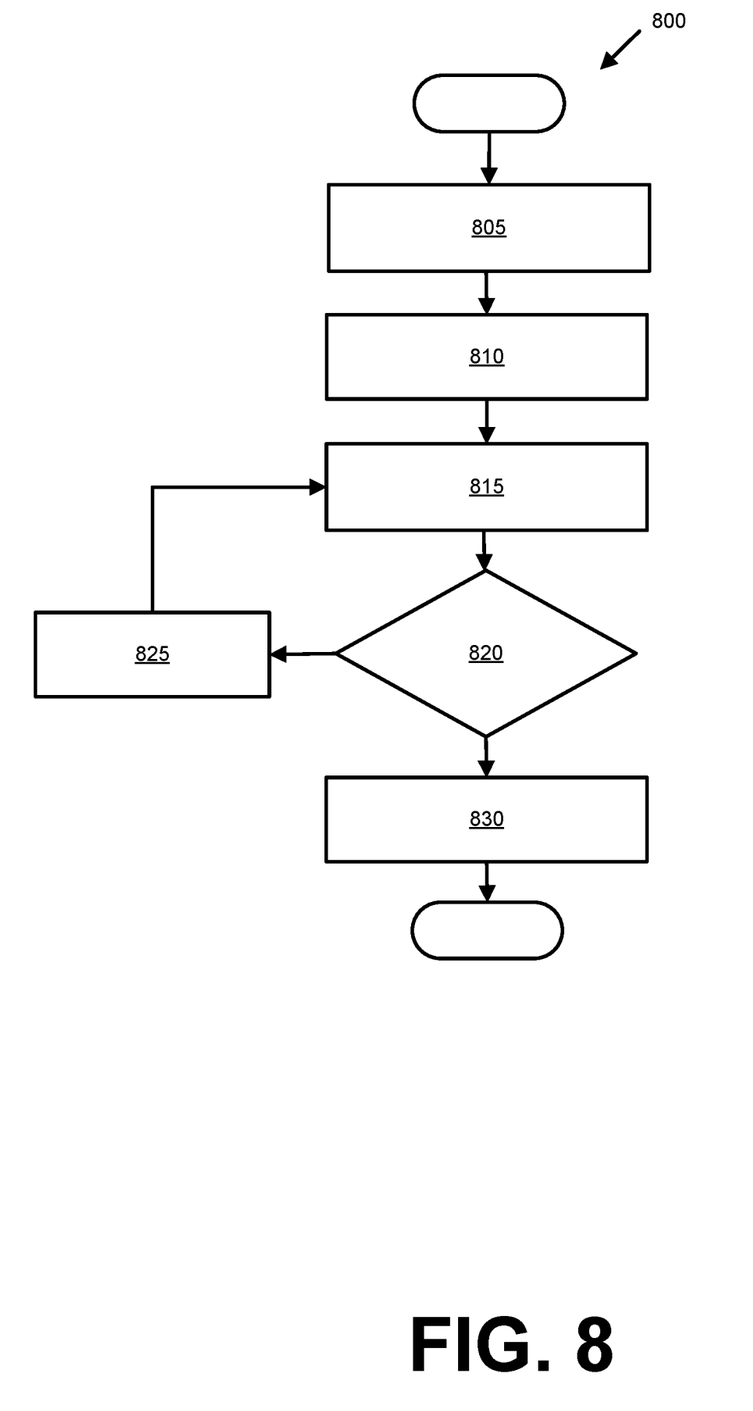
FIG. 8 is a flow diagram illustrating an example process for training a deep neural network.

FIG. 8 is a flowchart of an exemplary process 800 for training the DNN 300. Blocks of the process 800 can be executed by the server 145. The process 800 begins at block 805 in which training images are received. At block 810, one or more weight and/or bias parameters are initialized. At block 815, the DNN 300 performs processing on the testing images. In an example implementation, the DNN 300 can comprise a feed-forward convolutional neural network. In this implementation, the DNN 300 can perform feed forward processing operations on the training images.

At block 820, a determination is made whether a loss associated with a predicted distortion map generated by the DNN 300 has been minimized according to the loss function of the DNN 300. If the loss has not been minimized, one or more weights and/or bias parameters are updated at block 825. The weights and/or bias parameters can be updated using stochastic gradient descent with backpropagation. The process 800 then returns to block 815. Otherwise, if the loss has been minimized, the corresponding weights and/or parameters are stored in a data structure at block 830. The process 800 then ends.

Figure 9:
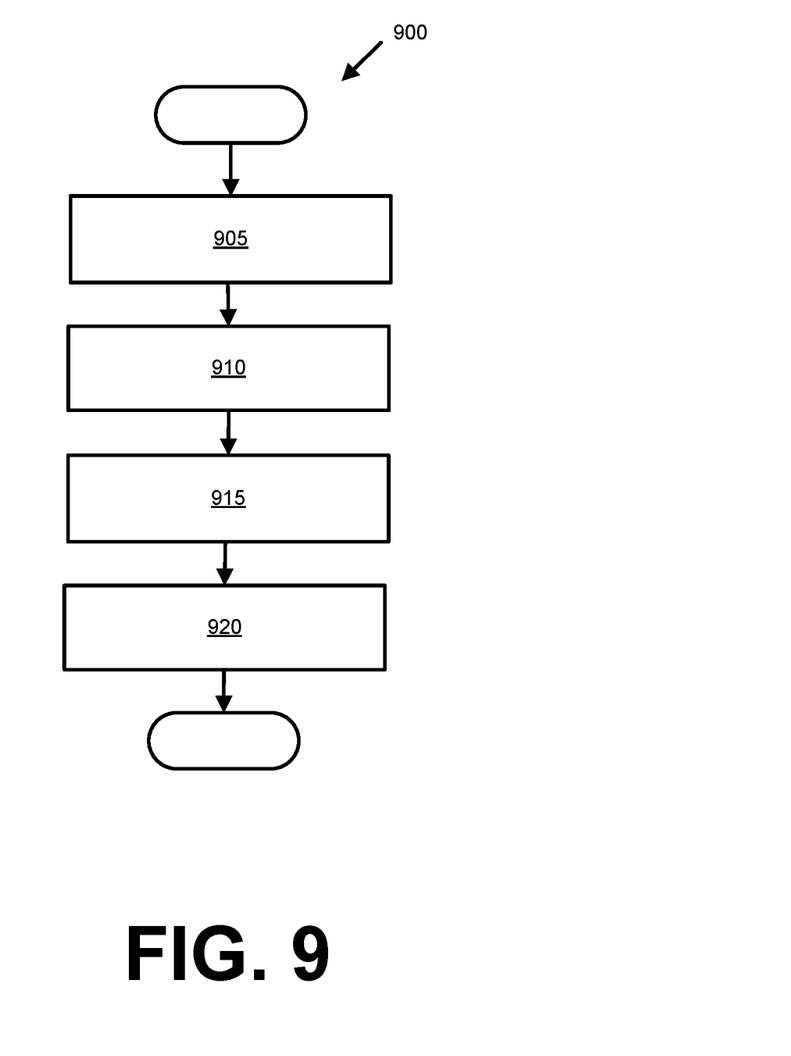
FIG. 9 is a flow diagram illustrating an example process for generating a distortion map.

FIG. 9 is a flowchart of an exemplary process 900 for generating a distortion map. Blocks of the process 900 can be executed by the server 145. The process 900 begins at block 905 in which an image projected onto a windshield is captured. For example, an image capture device may capture an image depicting a predefined pattern. At block 910, the captured image is provided to the DNN 300. At block 915, the DNN 300 predicts a distortion map based on the received image. In an example implementation, the DNN 300 may predict a distortion map based on one or more points within a defined eye box.

At block 920, the distortion map is stored within a data structure. As discussed above, the distortion map can be transmitted to one or more AR-HUD devices to use for mapping input pixel(s) to output(s) to mitigate image distortion. The process 900 then ends The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive, at a deep neural network, an image captured by an image capture device, wherein the image is projected onto a screen and includes distortion that is created by imperfections and surface disproportion along the screen;
   generate, by the deep neural network, a predicted distortion map based on the image, wherein the predicted distorted map is estimated based on one or more predefined points along the screen, and wherein the processor applies the predicted distortion map to the image captured by the image capture device to create a substantially undistorted image; and
   update at least one weight of the deep neural network in response to determining a loss associated with the predicted distortion map generated by the deep neural network has been minimized by a loss function.

2. The system of claim 1, wherein the deep neural network comprises a convolutional neural network.

3. The system of claim 2, wherein the convolutional neural network comprises a feed-forward convolutional neural network.

4. The system of claim 1, wherein the image comprises an image projected onto the screen via an Augmented Reality based Head-up Display (AR-HUD) device.

5. The system of claim 4, wherein the screen comprises a windshield.

6. The system of claim 1, wherein the processor is further programmed to update the at least one weight using stochastic gradient descent with backpropagation.

7. The system of claim 1, wherein the processor is further programmed to determine at least one mapping of an input pixel to an output pixel based on the predicted distortion map.

8. A system comprising a computer including a processor and a memory, the memory including instructions such that the processor is programmed to:
   receive, at a convolutional neural network, an image captured by an image capture device, wherein the image is projected onto a screen and includes distortion that is created by imperfections and surface disproportion along the screen;
   generate, by the convolutional neural network, a predicted distortion map based on the image, wherein the predicted distorted map is estimated based on one or more predefined points along the screen, and wherein the processor applies the predicted distortion map to the image captured by the image capture device to create a substantially undistorted image; and
   update at least one weight of the convolutional neural network in response to determining a loss associated with the predicted distortion map generated by the convolutional neural network has been minimized by a loss function.

9. The system of claim 8, wherein the convolutional neural network comprises a feed-forward convolutional neural network.

10. The system of claim 8, wherein the image comprises an image projected onto the screen via an Augmented Reality based Head-up Display (AR-HUD) device.

11. The system of claim 10, wherein the screen comprises a windshield.

12. The system of claim 8, wherein the processor is further programmed to update the at least one weight using stochastic gradient descent with backpropagation.

13. The system of claim 8, wherein the processor is further programmed to determine at least one mapping of an input pixel to an output pixel based on the predicted distortion map.

14. A method comprising:
- receiving, at a deep neural network, an image captured by an image capture device, wherein the image is projected onto a screen and includes distortion that is created by imperfections and surface disproportion along the screen;
- generating, by the deep neural network, a predicted distortion map based on the image, wherein the predicted distorted map is estimated based on one or more predefined points along the screen, and wherein a processor that executes the deep neural network applies the predicted distortion map to the screen captured by the image capture device to create a substantially undistorted image; and
- updating at least one weight of the deep neural network in response to determining a loss associated with the predicted distortion map generated by the deep neural network has been minimized by a loss function.

15. The method of claim 14, wherein the deep neural network comprises a convolutional neural network.

16. The method of claim 15, wherein the convolutional neural network comprises a feed-forward convolutional neural network.

17. The method of claim 14, wherein the image comprises an image projected onto the screen via an Augmented Reality based Head-up Display (AR-HUD) device.

18. The method of claim 17, wherein the screen comprises a windshield.

19. The method of claim 14, the method further comprising:
- updating the at least one weight using stochastic gradient descent with backpropagation.

20. The method of claim 14, the method further comprising:
- determining at least one mapping of an input pixel to an output pixel based on the predicted distortion map.

* * * * *